United States Patent [19]
Kusakabe

[11] Patent Number: 6,035,096
[45] Date of Patent: Mar. 7, 2000

[54] VIDEO/AUDIO DECODING AND REPRODUCING APPARATUS AND METHOD

[75] Inventor: Shinji Kusakabe, Tokyo, Japan

[73] Assignee: Mitsubishi Denki Kabushiki Kaisha, Tokyo, Japan

[21] Appl. No.: 08/813,305

[22] Filed: Mar. 10, 1997

[30] Foreign Application Priority Data

Sep. 3, 1996 [JP] Japan .................................. 8-233367

[51] Int. Cl.$^7$ .............................. H04N 5/91; H04N 5/225
[52] U.S. Cl. ........................... 386/104; 386/96; 386/120
[58] Field of Search .................................. 386/75, 96, 95, 386/104, 109, 111, 112, 120, 33, 27, 8, 39; H04N 5/91, 5/225

[56] References Cited

U.S. PATENT DOCUMENTS 5,583,652  12/1996  Ware ......................................... 386/96
5,835,671  11/1998  Kitamura et al. ......................... 386/97

FOREIGN PATENT DOCUMENTS 4104683  7/1992  Japan .

*Primary Examiner*—Robert Chevalier
*Attorney, Agent, or Firm*—Leydig, Voit & Mayer, Ltd.

[57] ABSTRACT

Encoded video data and audio data for a high resolution still picture are read by a reader from a recording medium, and are input to a video/audio separator. A buffer control unit of a controller monitors the amount of video data stored with respect to a storage capacity allotted to a video bit-stream area of a memory to prevent overflow or underflow with respect to the data storage. The video data separated by the video/audio separator is temporarily stored in a storage unit. The temporarily stored video data is decoded by a video decoder, the decoded video data is temporarily stored in the storage unit and is output to a decoded-video data output terminal as video display data. The audio data from the video/audio separator is transmitted to an audio decoder via an audio-data transmitter, is decoded, and is output to an audio-decoded data output terminal as decoded audio data.

13 Claims, 6 Drawing Sheets

VIDEO/AUDIO DECODING AND REPRODUCING APPARATUS AND METHOD

BACKGROUND OF THE INVENTION

1. Field of the Invention

The present invention relates to a video/audio decoding and reproducing apparatus which separates video data and audio data from a decoded signal including encoded video data and audio data, separately decodes the separated video data and audio data, respectively, and outputs the decoded video data and the decoded audio data. More particularly, the invention relates to a video/audio decoding and reproducing apparatus which is capable of effectively utilizing a storage means used at the time of decoding the video data. Also, the invention relates to a method of decoding and reproducing encoded video and audio data in the video/audio decoding and reproducing apparatus.

2. Description of the Related Art

In a video CD system, video data and audio data for a motion and/or a still picture having a pixel size of 352×240 (NTSC system) and audio, which are encoded in conformity with ISO/IEC 11172, are recorded on a recording medium (e.g., a video CD)

The video data and audio data conform to the video CD standards and ISO/IEC 11172, and are recorded as a data stream in which video packets, each having a packet header and encoded video data, and audio packets, each having a packet header and encoded audio data, are read out in a time series.

The data stream is read out from the thus-recorded recording medium by a reader (e.g., a configuration including a pickup and a CD-DSP (compact disk-digital signal processor)).

The data stream which has been read out by the reader is inputted to the video/audio decoding and reproducing apparatus. The video/audio decoding and reproducing apparatus separates the video data and audio data, respectively, from the inputted data stream, separately decodes the separated video data and audio data, and outputs the decoded data as decoded video data and decoded audio data.

A more detailed description will be given of the decoding of video data and audio data in the video/audio decoding and reproducing apparatus.

First, a description will be given of a case where the stream data which has been read out by the reader is the data stream for on a motion picture.

When data stream is inputted, the inputted data stream is separated into video data and audio data. The separated video data and audio data are temporarily stored in a storage means. The video data stored temporarily in the storage means is decoded by a video decoder, and the decoded video data is temporarily stored in the storage means.

In MPEG 1 (Moving Picture Experts Group Phase 1), the decoding of the video data by the video decoder comprises an intraframe encoded video (hereafter referred to as the I picture (intra-picture)), and an intraframe forwardly predictive coded video (hereafter referred to as the P picture (predictive-picture)), and a bidirectionally predictive coded video (hereafter referred to as the B picture (bidirectionally predictive-picture)). Hence, the video data on the I picture is decoded on the basis of the video data on the I picture which is sequentially stored temporarily in the storage means. This decoded video data on the I picture is temporarily stored in the storage means.

Next, on the basis of the video data on the P picture which is consecutively stored temporarily in the storage means, the video data on the P picture is decoded by referring to the decoded video data on the I picture stored temporarily in the storage means. This decoded video data on the P picture is stored temporarily in the storage means.

Subsequently, on the basis of the video data on the B picture which is consecutively stored temporarily in the storage means, the video data on the B picture is decoded by referring to the decoded video data on the I picture and the decoded video data on the P picture, which are stored temporarily in the storage means. This decoded video data on the B picture is stored temporarily in the storage means.

The decoded video data on the I picture, P picture, and B picture stored temporarily in the storage means is read by the video decoder at predetermined times, respectively. The video decoder outputs from a decoded video data output terminal video display data based on the decoded video data which has been read.

Meanwhile, the audio data stored temporarily in the storage means is decoded by an audio decoder so as to be outputted as decoded audio data which is decoded at the same time as the decoded video data in which the video data corresponding to the audio data is decoded. The decoded audio data is outputted from a decoded audio data output terminal. At this time, the storage means functions as a delay means for synchronization of the audio data with the decoding of the video data.

In addition, in a case where the stream data which is read out by the reader is data stream for on a still picture, the operation is as follows.

When data stream is inputted, the inputted data stream is separated into video data and audio data in the same way as the case of the motion picture. The separated video data and audio data are temporarily stored in the storage means. The video data stored temporarily in the storage means is decoded by the video decoder, and the decoded video data is temporarily stored in the storage means.

At this time, since the video data is one on the still picture, the decoded video data is generated without needing to refer to the decoded video data decoded before as in the case concerning the motion picture.

Therefore, the decoded video data stored temporarily in the storage means is read out by the video decoder at a predetermined timing. The video decoder outputs from a decoded video data output terminal video display data based on the vide o decoded data which has been read.

Meanwhile, the audio data stored temporarily in the storage means is decoded by the audio decoder so as to be outputted as decoded audio data which is decoded at the same time as the decoded video data in which the video data corresponding to the audio data is decoded. The decoded audio data is outputted from the decoded audio data output terminal.

In recent years, there has been a demand to record on a recording medium encoded video data and audio data for a high resolution still picture with the number of pixels per picture four times that of a motion picture or a still picture, i.e., 704×480 (NTSC system), and to decode the same by a video/audio decoding and reproducing apparatus.

However, the following problems are encountered in the video/audio decoding and reproducing apparatus configured as described above.

That is, since the decoded video data decoded by the video decoder is temporarily stored in the storage means, in the case of the high resolution still picture with the number of pixels per picture is four times that of a motion picture, the required storage capacity of the storage means becomes ⅓ times that of a motion picture. Accordingly, in order to make possible to decode the high resolution still picture as well, it is conceivable to enhance the storage capacity of the storage means by some means or other.

A more detailed description will be given of this aspect.

In the case concerning the motion picture, the storage capacity which is necessary for the storage means requires at least areas for respectively storing the encoded video data and audio data which have been read out from the storage medium (hereafter referred to as the video bit-stream area and the audio bit-stream area, respectively) and an area for storing the decoded video data decoded by the video decoder (hereafter referred to as the decoded video data motion picture area).

Then, the storage capacity imparted to one pixel in the decoded video data, i.e., the number of bytes (in this example, 1 byte=8 bits) is 1.5 bytes. That is, in the video format in the video CD standards, the color difference signals Cb and Cr are respectively ¼ with respect to 1 of the luminance signal in the video format of MPEG 1, and 1 byte is allotted to the luminance signal per pixel, so that 1.5 bytes are allotted to one pixel.

Therefore, the volume of bytes per picture in the decoded video data motion picture area is 126,720 (=352×240×1.5) bytes, so that 380,160 (=126,720×3) bytes are required as the storage capacity of the decoded video data motion picture area.

In addition, about 37.5 kilobytes are required as the storage capacity of the video bit-stream area in the MPEG 1 standards. The storage capacity of the audio bit-stream area may be smaller than the storage capacity of the video bit-stream area, but a predetermined volume of storage capacity is required.

Accordingly, as the storage means for the motion picture, it is sufficient to use a memory of 512 kilobytes (words)×8 bits, specifically a 4M DRAM.

In addition, in the case concerning the still picture, the storage capacity which is necessary for the storage means requires at least the video bit-stream area, the audio bit-stream area, and an area for storing the decoded video data decoded by the video decoder (hereafter referred to as the decoded video data still picture area).

However, since the storage capacity of the decoded video data still picture area may be a capacity which is capable of storing the decoded video data of a one-picture portion, the storage capacity of the storage means can be smaller than the case concerning the motion picture, and the storage means for the motion picture, specifically the 4M DRAM, may be used as it is.

On the other hand, in the case concerning the high resolution still picture, the storage capacity of the area for storing the decoded video data decoded by the video decoder (hereafter referred to as the decoded video data high resolution still picture area) requires 506,880 (=704×480×1.5) bytes.

Accordingly, if the storage means for the motion picture, specifically the 4M DRAM, is used, the storage capacity of the storage means other than the decoded video data high resolution still picture area is 5,120 bytes.

Therefore, if an attempt is conceivably made to add the storage capacities of the video bit-stream area and the audio bit-stream area to the storage means, it is necessary to newly add one memory as the storage means, e.g., a 1M DRAM or a 4M DRAM, or to change the memory to one having a large storage capacity, e.g., a 16M DRAM. Hence, the addition of the memory or the change to a memory having a large storage capacity entails an increase in the mounting area in the video CD system including the video/audio decoding and reproducing apparatus, leading to a higher cost.

SUMMARY OF THE INVENTION

The present invention has been made in view of the above-described circumstances, and therefore an object of the invention is to provide a video/audio decoding and reproducing apparatus which is capable of decoding a motion picture and a high resolution still picture and of effectively utilizing a storage means used at the time of decoding video data.

Another object of the present invention is to provide a video/audio decoding and reproducing apparatus which is capable of decoding even the high resolution still picture by using a storage means having a necessary and sufficient storage capacity for the motion picture.

A video/audio decoding and reproducing apparatus in accordance with a first aspect of the present invention comprises: storage means, a video decoder, and an audio decoder, wherein when encoded video data and audio data on a motion picture is inputted, the inputted video data and audio data are temporarily stored in the storage means, the video data stored temporarily in the storage means is decoded by the video decoder, the decoded video data is temporarily stored in the storage means, and the audio data stored temporarily in the storage means is decoded by the audio decoder, and wherein when encoded video data and audio data on a high resolution still picture is inputted, the inputted video data is temporarily stored in the storage means, the video data stored temporarily in the storage means is decoded by the video decoder, the decoded video data is temporarily stored in the storage means, and the inputted audio data is decoded by the audio decoder without being temporarily stored in the storage means.

In a video/audio decoding and reproducing apparatus in accordance with a second aspect of the present invention, in the first aspect of the invention, an amount of video data stored temporarily in the storage means is detected, and the video data in inputted to the storage means on the basis of a result of detection thereof. Further, the detection of the amount of video data stored temporarily in the storage means is effected by means of an address signal for the video data which is inputted to the storage means and an address signal for the video data which is read from the storage means.

A video/audio decoding and reproducing apparatus in accordance with a third aspect of the present invention comprises: a video/audio separator to which a packet having a packet header and encoded video data and a packet having a packet header and encoded audio data are inputted as stream data in a time series, and which separates the video data and the audio data, respectively, from the inputted stream data, and outputs the separated video data and audio data in a time series from a data output node; storage means a data input node of which is connected to the data output node of the video/audio separator, and which temporarily stores the data inputted to the data input node from the data output node of the video/audio separator, temporarily stores decoded video data, and outputs the temporarily stored data from a data output node; a video decoder which decodes the video data stored temporarily in the storage means and outputted from the data output node of the storage means, outputs the decoded video data to the storage means as the decoded video data, receives the decoded video data stored temporarily in the storage means and outputted from the data output node of the storage means, and outputs video display data based on the received decoded video data from a decoded video data output terminal; audio-data transmitting means which is connected to the data output node of the video/audio separator and the data output node of the storage means, wherein when audio data on a high resolution still picture is outputted from the data output node of the video/audio separator, the audio-data transmitting means receives and outputs the audio data outputted from the data output node of the video/audio separator, whereas when audio data on a motion picture is outputted from the data output node of the storage means, the audio-data transmitting means receives and outputs the audio data outputted from the data output node of the storage means; and an audio decoder for decoding the audio data outputted from the audio-data transmitting means and for outputting the decoded audio-decoded data to an audio-decoded data output terminal.

A video/audio decoding and reproducing apparatus in accordance with a fourth aspect of the present invention further comprises, in addition to constituent elements of the third aspect of the invention, the following: write address output means for outputting a write address signal for the video data on the high resolution still picture inputted from the data output node of the video/audio separator to the data input node of the storage means; read address output means for outputting a read address signal for the video data on the high resolution still picture stored in the storage means; and control means having a buffer controller for outputting a write enable signal and a read enable signal on the basis of the write address signal from the write address output means and the read address signal from the read address output means, wherein the storage means receives the write address signal, the write enable signal, the read address signal, and the read enable signal from the control means, and is set in a writable state on the basis of the received write enable signal, and the video data on the high resolution still picture inputted to the data input node is written at an address based on the received write address signal, while the storage means is set in a readable state on the basis of the received read enable signal, and the video data on the high resolution still picture stored in the address based on the received read address signal is read from the data output node.

A video/audio decoding and reproducing apparatus in accordance with a fifth aspect of the present invention comprises: a video/audio separator to which a packet having a packet header and encoded video data and a packet having a packet header and encoded audio data are inputted as stream data in a time series, and which separates the video data and the audio data, respectively, from the inputted stream data, and outputs the separated video data and audio data in a time series from a data output node; storage means having a data input/output node connected to the data output node of the video/audio separator, an address signal input node to which a write address signal and a read address signal are inputted, an enable signal input node to which a write enable signal and a read enable signal are inputted, and a storage unit wherein if the write enable signal is inputted to the enable signal input node, and the write address signal is inputted to the address signal input node, the data inputted to the data input/output node is stored at an address based on the inputted write address signal, and wherein if the read enable signal is inputted to the enable signal input node, and the read address signal is inputted to the address signal input node, the data stored at an address based on the inputted read address signal is read from the data input/output node; a video decoder which Adecodes the video data outputted from the data input/output node of the storage means, outputs the decoded video data to the data input/output node of the storage means, and outputs to a decoded video data output terminal video display data based on the decoded video data outputted from the data input/output node of the storage means; audio-data transmitting means having an input node connected to the data output node of the video/audio separator and the data input/output node of the storage means so as to output from an output node the audio data inputted to the input node on the basis of an audio-data transmission enable signal; and an audio decoder for decoding the audio data outputted from the output node of the audio-data transmitting means and for outputting the decoded audio-decoded data to an audio-decoded data output terminal.

A video/audio decoding and reproducing apparatus in accordance with a sixth aspect of the present invention further comprises, in addition to constituent elements of the fifth aspect of the invention, the following: write address output means for outputting the write address signal to the address signal input node of the storage means; read address output means for outputting the read address signal to the address signal input node of the storage means; and control means having a buffer controller for outputting to the enable signal input node of the storage means the write enable signal and the read enable signal on the basis of the write address signal from the write address output means and the read address signal from the read address output means.

A video/audio decoding and reproducing apparatus in accordance with a seventh aspect of the present invention comprises: a video/audio separator to which a packet having a packet header and encoded video data and a packet having a packet header and encoded audio data are inputted as stream data in a time series, and which separates the video data and the audio data, respectively, from the inputted stream data, and outputs the separated video data and audio data in a time series from a data output node; a video decoder which receives video data stored in the storage means, decodes the received video data, outputs the decoded video data to the storage means, receives the decoded video data stored in the storage means, and outputs video display data based on the received decoded video data from a decoded video data output terminal; audio-data transmitting means wherein when audio data on a high resolution still picture is outputted from the data output node of the video/audio separator, the audio-data transmitting means receives and outputs the audio data outputted from the data output node of the video/audio separator, whereas when audio data on a motion picture is outputted from the storage means, the audio-data transmitting means receives and outputs the audio data outputted from the storage means; and an audio decoder for decoding the audio data outputted from an output node of the audio-data transmitting means and for outputting the decoded audio-decoded data to an audio-decoded data output terminal.

A video/audio decoding and reproducing apparatus in accordance with an eighth aspect of the present invention comprises: a video/audio separator to which a packet having a packet header and encoded video data and a packet having a packet header and encoded audio data are inputted as stream data in a time series, and which separates the video data and the audio data, respectively, from the inputted stream data, and outputs the separated video data and audio data in a time series from a data output node; a video decoder which has a data input/output node connected to the data input/output node of the storage means, decodes the video data inputted to the data input/output node, outputs the decoded video data to the data input/output node, and outputs to a decoded video data output terminal video display data based on the decoded video data inputted to the data input/output node; audio-data transmitting means having an input node connected to the data output node of the video/audio separator so as to output from an output node the audio data inputted to the input node on the basis of an audio-data transmission enable signal; and an audio decoder for decoding the audio data outputted from the output node of the audio-data transmitting means and for outputting the decoded audio-decoded data to an audio-decoded data output terminal.

The above and other objects and features of the present invention will be more apparent from the following description taken in conjunction with the accompanying drawings.

BRIEF DESCRIPTION OF THE PREFERRED EMBODIMENTS

Figure 1:
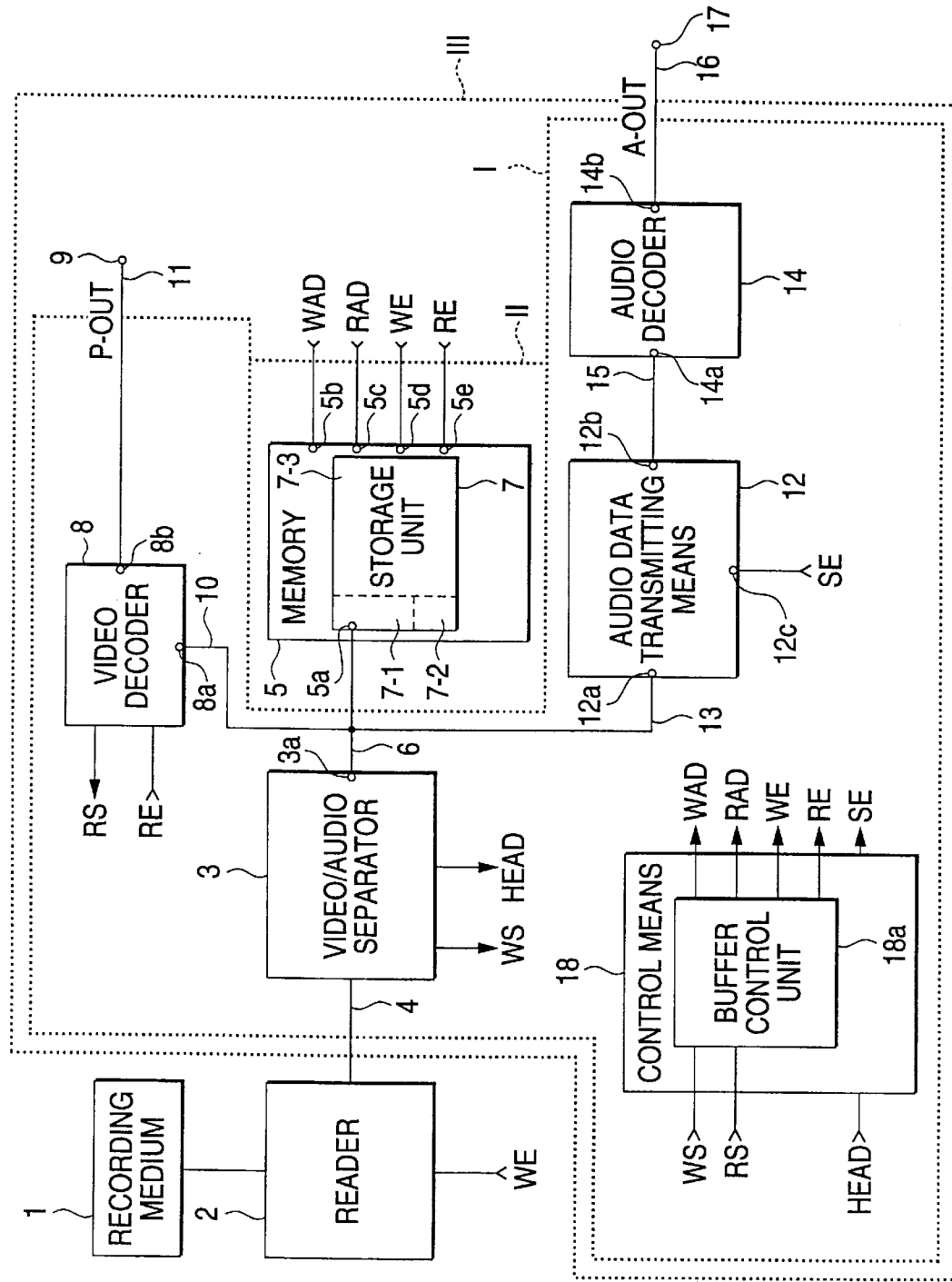
FIG. 1 is a block diagram illustrating a first embodiment of the present invention.
Figure 3A:
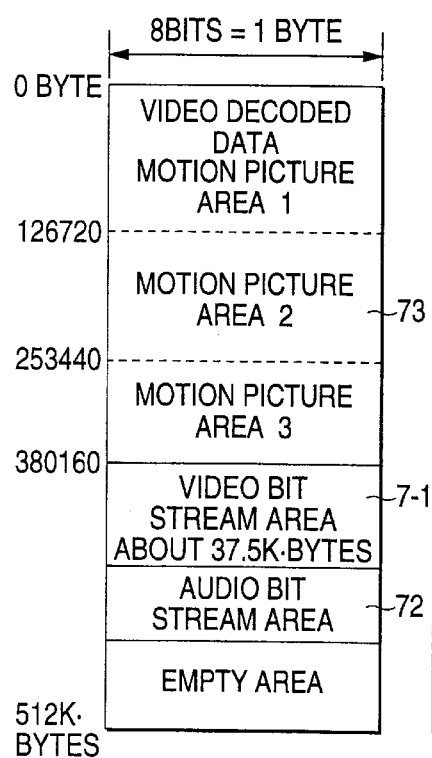
Figure 3B:
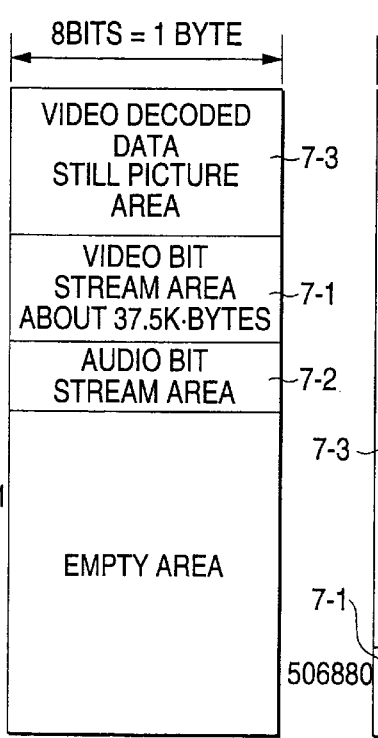
Figure 3C:
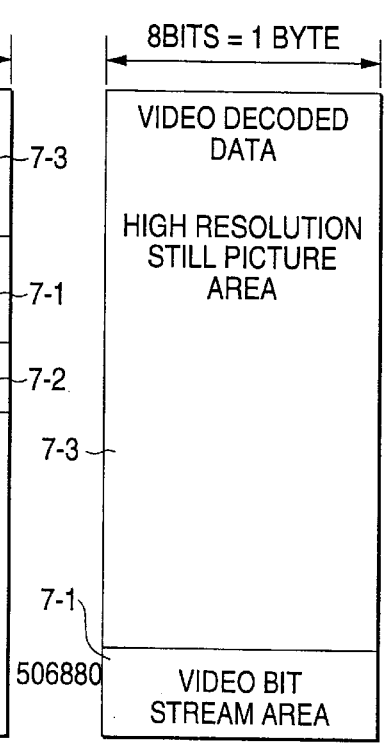
Figure 4:
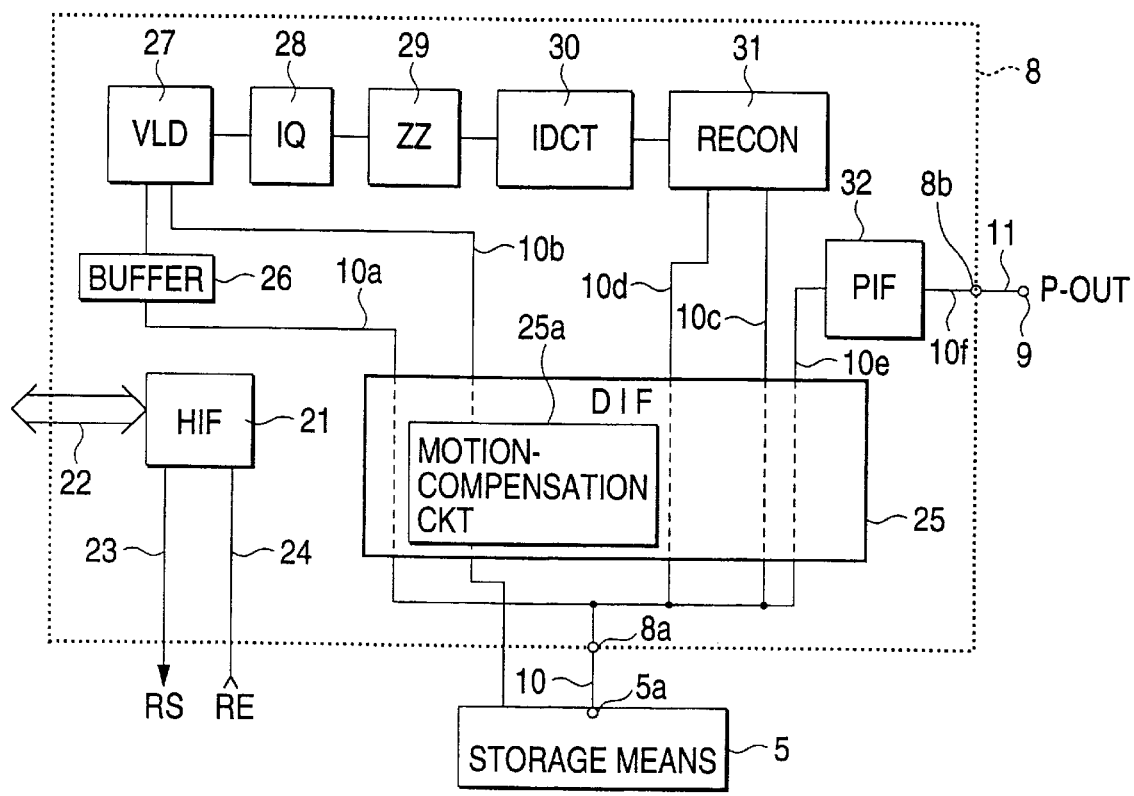
Figure 5:
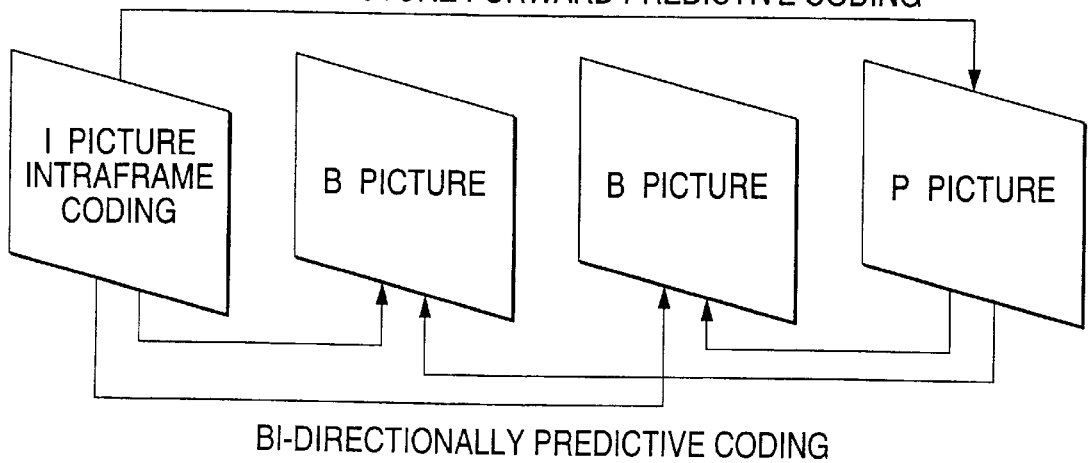
Figure 6:
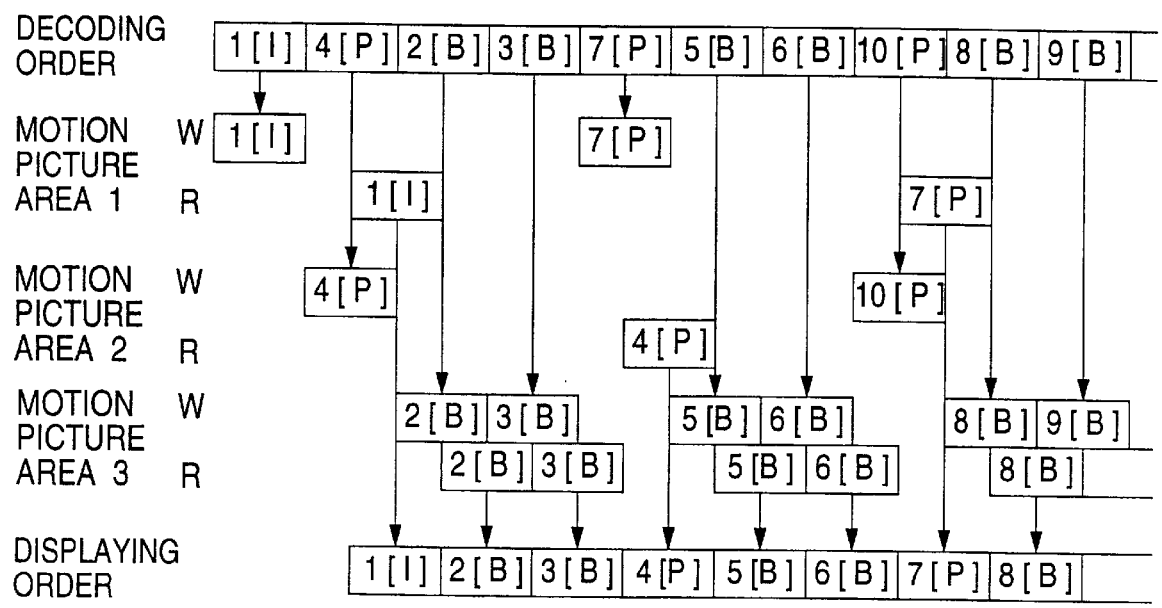
Figure 7:
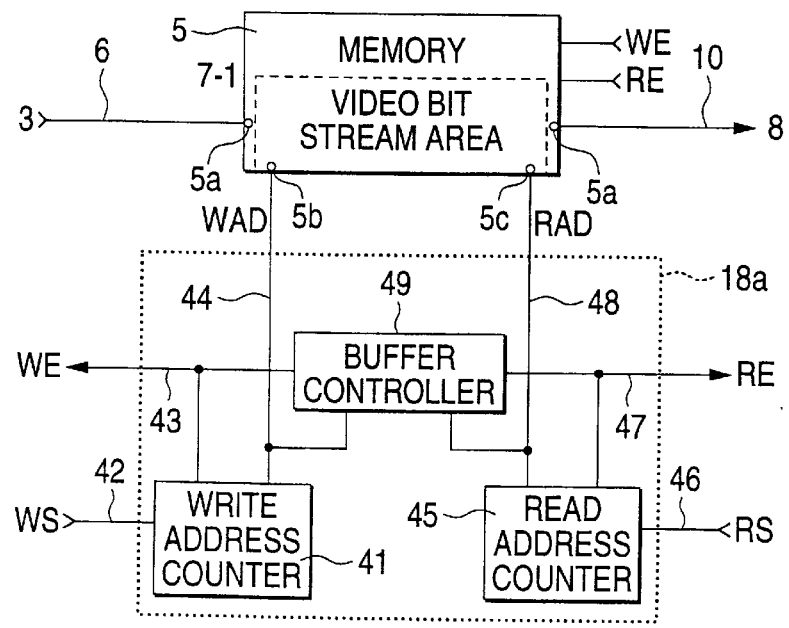
Figure 8:
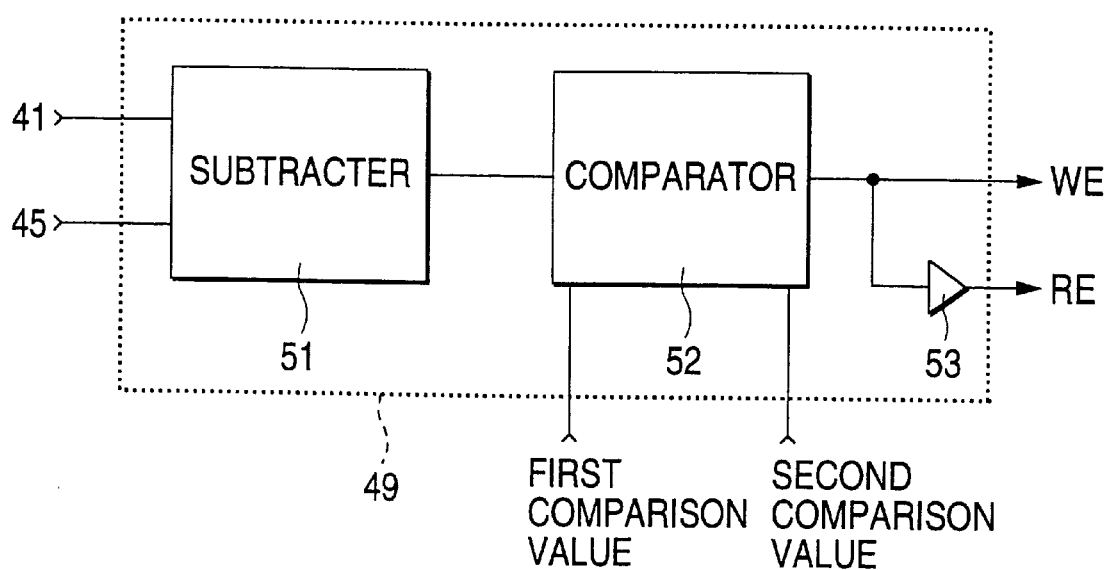

FIGS. 3A to 3C are diagrams illustrating storage capacities of a video bit-stream area 7-1, an audio bit-stream area 7-2, and a decoded video data area 7-3 which are allotted to a storage unit 7 of a storage means shown in FIG. 1;

FIG. 4 is a block diagram illustrating a video decoder 8 shown in FIG. 1;

FIG. 5 is a diagram illustrating screen types and an encoding procedure (code procedure);

FIG. 6 is a diagram illustrating a decoding procedure, a state of storage of decoded video data in the storage unit 7 of the storage means 5, and a display procedure in the case of a motion picture;

FIG. 7 is a block diagram illustrating a buffer control unit 18a of a control means 18 in a second embodiment of the present invention; and FIG. 8 is a block diagram illustrating a buffer control unit 49 shown in FIG. 7.

DETAILED DESCRIPTION OF THE PREFERRED EMBODIMENTS

A description will be given in more detail of embodiments of the present invention with reference to the accompanying drawings.

(First Embodiment)

FIGS. 1 to 6 show a first embodiment of the present invention.

In FIG. 1, reference numeral 1 denotes a recording medium on which video data and audio data on a motion and/or still picture having a pixel size of 352×240 (NTSC system) and audio, which are encoded in conformity with ISO/IEC 11172, and/or encoded video data and audio data on a high resolution still picture having a pixel size of 704×480 (NTSC system) and audio are recorded.

It should be noted that the motion picture is displayed on a display at a rate of 30 frames (pictures) per minute in the case of the NTSC system. In addition, as the pixel size (corresponding to the number of pixels per picture) of the high resolution still picture, a pixel size which is four times that of the motion picture is shown, the pixel size of the high resolution still picture is not confined to the same. In short, the first embodiment can be applied if the pixel size of the high resolution still picture is larger than that of the motion picture.

The video data and audio data which are recorded on the recording medium 1 conform to the video CD standards and ISO/IEC 11172, and are configured as a data stream in which packets each having a packet header and encoded video data and packets each having a packet header and encoded audio data are read out in a time series.

Figure 2:
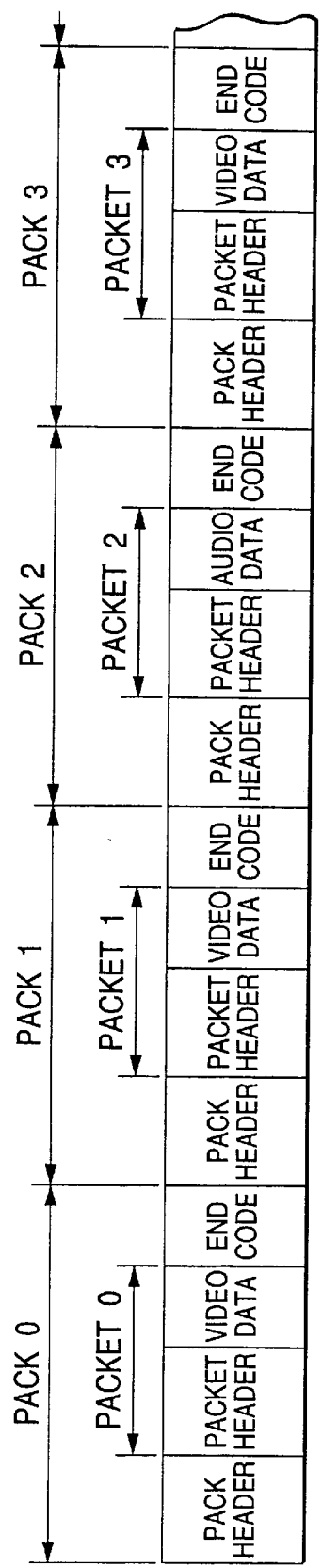
FIG. 2 is a diagram illustrating a specific configuration of stream data.

As shown in FIG. 2, the data stream is specifically configured such that a pack header, a layer called a packet comprising a pack header and video data or audio data, and a layer called a pack having an end code continue in a time series.

In the packet header in the packet, information on video data or audio data is incorporated, including, specifically, information on PTS (presentation time stamp—information on management of the timing of reproduction and output), information on DTS (decoding time stamp—additional information such as information on management of the timing of decoding), and identification information that indicates which one of the motion picture, still picture, high resolution still picture, and audio the data in the packet represents.

Further, information on the packet, specifically including information on SCR (system clock reference—additional information on a system clock reference value and the like) and the like, is incorporated in the pack header in the pack.

The end code in the pack represents information indicating that the pack ends.

In FIG. 1, reference numeral 2 denotes a reader for reading the data stream recorded on the above-described recording medium 1 and for outputting the data stream which has been read when the reader is set in a writable state by a write enable signal WE. In terms of its configuration, the reader 2 comprises, for example, a pickup, a CD-DSP (compact disk-digital signal processor), an error correction code (ECC), and the like.

Reference numeral 3 denotes a video/audio separator to which the data stream from the reader 2 is inputted via a data stream transmission line (including a bus, and collectively referred to as the line), which separates the video data and the audio data from the inputted stream data, respectively, and which outputs the separated video data and audio data from a data output node 3a in a serial bit stream and outputs a signal based on the pack header and the packet header. It should be noted that, in FIG. 1, a write strobe signal WS based on the pack header which is mainly related to this first embodiment as well as an identification signal HEAD that indicates which one of the motion picture, still picture, high resolution still picture, and audio the data represents on the basis of the packet header.

Reference numeral 5 denotes a storage means for temporarily storing the data from the data output node 3a of the above-described video/audio separator 3, for temporarily storing the decoded video data, and for outputting the temporarily stored data.

This storage means 5 specifically uses a 4M DRAM, and comprises a data input/output node 5a connected to the data output node 3a of the above-described video/audio separator 3 via a first data transmission line 6; address signal input nodes 5b and 5c to which a write address signal WAD and a read address signal RAD are respectively inputted; enable signal input nodes 5d and 5e to which a write enable signal WE and a read enable signal RE are respectively inputted; and a storage unit 7 wherein when the write enable signal WE is inputted to the aforementioned enable signal input node 5d, and the storage unit 7 is set in the writable state on the basis of the inputted write enable signal WE and the write address signal WAD is inputted to the aforementioned address signal input node 5b, data inputted to the aforementioned data input/output node 5a is stored at the address based on the inputted write address signal WAD, and wherein when the read enable signal RE is inputted to the aforementioned enable signal input node 5e, and the storage unit 7 is set in the readable state on the basis of the inputted read enable signal RE and the read address signal RAD is inputted to the aforementioned address signal input node 5c, the data stored at the address based on the inputted read address signal RAD is read out to the aforementioned data input/output node 5a.

It should be noted that although the address signal input nodes 5b and 5c are shown as separate nodes in FIG. 1 to facilitate an understanding, the address signal input nodes 5b and 5c in this first embodiment are one and the same node, and are typically shown by one of the nodes having the same numbers of bits of the write address signal WAD and the read address signal RAD. However, the address signal input nodes 5b and 5c may be separate nodes.

In addition, although the enable signal input nodes 5d and 5e are shown as separate nodes in FIG. 1 to facilitate an understanding, the enable signal input nodes 5d and 5e in this first embodiment are one and the same node. At this time, the write enable signal WE and the read enable signal RE are an enable signal constituted by a signal having two values, wherein one of the two values of the enable signal represents the write enable signal WE, and the other value represents the read enable signal RE. However, the enable signal input nodes 5d and 5e may be separate nodes. At this time, the read enable signal RE is set as an inverted signal of the write enable signal WE.

In addition, when encoded video data and audio data for a motion picture are inputted to the data input/output node 5a, the storage area in the storage unit 7 of the above-described storage means 5 is allotted by -addresses in such a manner as to be provided with a video bit-stream area 7-1, an audio bit-stream area 7-2, and a decoded video data area 7-3, as shown in FIG. 3A. The decoded video data area 7-3 is further allotted to three motion picture areas 1 to 3.

Further, when encoded video data and audio data for a still picture are inputted to the data input/output node 5a, the storage area in the storage unit 7 of the storage means 5 is allotted by addresses in such a manner as to be provided with a video bit-stream area 7-1, an audio bit-stream area 7-2, and a decoded video data area 7-3 (still picture area), as shown in FIG. 3B.

Furthermore, when encoded video data and the audio data for a high resolution still picture are inputted to the data input/output node 5a, the storage area in the storage unit 7 of the storage means 5 is allotted by addresses in such a manner as to be provided with a video bit-stream area 7-1, and a decoded video data area 7-3 (high resolution still picture area), as shown in FIG. 3C.

The above-described video/audio separator 3 and storage means 5 are subjected to clock control in such a manner that the speed at which the video data and the audio data for the high resolution still picture are written from the video/audio separator 3 into the storage means 5 is slower than the speed at which the video data and the audio data for the motion picture are written from the video/audio separator 3 into the storage means 5.

In FIG. 1, reference numeral 8 denotes a video decoder which receives the video data stored temporarily in the video bit-stream area 7-1 in the storage unit 7 of the storage means and decodes the received video data, and outputs the decoded video data to the storage means 5, and which receives the decoded video data stored temporarily in the decoded video data area 7-3 in the storage unit 7 of the storage means 5, and outputs video display data based on the received decoded video data to a decoded video data output terminal P-OUT 9.

This video decoder 8 has a data input/output node 8a connected to the data input/output node 5a of the storage means via a second data transmission line 10, has a decoded-data output node 8b connected to the decoded video data output terminal 9 via a third data transmission line 11, receives the read enable signal RE, and outputs a read strobe signal RS.

If the received video data is the video data on the I picture, the video decoder 8 decodes the video data on the I picture, and outputs the decoded video data on the I picture to the storage means 5. If the received video data is the video data on the P picture, the video decoder 8 decodes the video data on the P picture by referring to the decoded video data on the I picture stored temporarily in the storage means 5 or the previously decoded video data on the P picture, and outputs the decoded video data on the P picture to the storage means 5. Further, if the received video data is the video data on the B picture, the video decoder 8 decodes the video data on the B picture by referring to the decoded video data on the I picture stored temporarily in the storage means 5 or the previously decoded video data on the P picture and the decoded video data on the P picture, and outputs the decoded video data on the B picture to the storage means 5.

This video decoder 8 has a configuration which is specifically shown in FIG. 4.

In FIG. 4, reference numeral 21 denotes a host bus interface HIF for effecting exchange of control data with a control means constituted by, for example, a CPU or the like via control lines 22, 23, and 24. To clarify a point concerning the present invention, the read strobe signal transmission line 23 and the read enable signal transmission line 24 among these control lines are shown separately.

Reference numeral 25 denotes a DRAM interface DIF for receiving video data from the storage means 5 and for effecting exchange of decoded video data with the storage means 5, and has a motion-compensation circuit 25a. Incidentally, as for the DRAM interface DIF 25, its data input/output node 25a is connected to the data input/output node 5a of the storage means 5 via the second data transmission line 10, and address information from the motion-compensation circuit 25a is imparted to the address signal input node 5c of the storage means 5.

Reference numeral 26 denotes a buffer to which video data from the storage means 5 is inputted via the second data transmission line 10, the DRAM interface DIF 25, and a transmission line 10a, and which temporarily stores the inputted video data and outputs the same as video data of a predetermined number of bits, i.e., 32 bits in this first embodiment.

Reference numeral 27 denotes a variable-length decoder VLD which receives the video data from this buffer, effects generally known predetermined processing, and outputs the same as a decoded signal. If the inputted video data is the video data on the P picture and the video data on the B picture, the variable-length decoder VLD 27 also outputs the decoded signal to the motion-compensation circuit 25a of the aforementioned DRAM interface DIF 25 via a transmission line 10b. Reference numeral 28 denotes an inverse quantizer IQ for effecting generally known predetermined processing with respect to the decoded signal from the variable-length decoder VLD 27. Reference numeral 29 denotes an inverse zigzag transformer $ZZ^{-1}$ for effecting generally known predetermined processing with respect to the output from the inverse quantizer IQ 28. Reference numeral 30 denotes an inverse discrete cosine transformer IDCT for effecting generally known predetermined processing with respect to the output from the inverse zigzag transformer $ZZ^{-1}$ and for outputting the same as decoded pixel data.

Reference numeral 31 denotes a reconstructor RECON for effecting generally known predetermined processing with respect to the decoded pixel data from the inverse discrete cosine transformer IDCT, and for outputting the same as decoded video data to the storage means 5 via a transmission line 10c, the DRAM interface DIF 25, and the second data transmission line 10.

That is, if the decoded pixel data from the inverse discrete cosine transformer IDCT represents the video data on the I picture, this reconstructor RECON 31 outputs the decoded video data from the inverse discrete cosine transformer IDCT as the decoded video data on the I picture to the storage means 5 via the transmission line 10c, the DRAM interface DIF 25, and the second data transmission line 10.

If the decoded pixel data from the inverse discrete cosine transformer IDCT represents the video data on the P picture, as shown in FIG. 5, this reconstructor RECON 31 adds differential data based on the decoded pixel data from the inverse discrete cosine transformer IDCT and the decoded video data on the I picture inputted from the storage means 5 via the aforementioned second data transmission line 10, the DRAM interface DIF 25, and a transmission line 10d or the previously decoded video data on the P picture, and outputs the same as the decoded video data on the P picture to the storage means 5 via the transmission line 10c, the DRAM interface DIF 25, and the second data transmission line 10.

If the decoded pixel data from the inverse discrete cosine transformer IDCT represents the video data on the B picture, as shown in FIG. 5, this reconstructor RECON 31 outputs decoded video data to the storage means 5 via the transmission line 10c, the DRAM interface DIF 25, and the second data transmission line 10 as the decoded video data on the B picture which is based on differential data based on the decoded pixel data from the inverse discrete cosine transformer IDCT, the decoded video data on the I picture inputted from the storage means 5 via the second data transmission line 10, the DRAM interface DIF 25, and the aforementioned transmission line 10d or the previously decoded video data on the P picture, and the decoded video data on the P picture.

Reference numeral 32 denotes a display system interface PIF which reads at predetermined timings the decoded video data on the I picture, the P picture, and the B picture inputted respectively from the storage means 5 via the second data transmission line 10, the DRAM interface DIF 25, and the aforementioned data transmission line 10e, effects generally known predetermined processing, and outputs the processed video data to the decoded video data output terminal 9 via a transmission line 10f, the decoded-data output node 8b, and the third data transmission line 11 as video display data based on the decoded video data which has been read.

Returning to FIG. 1 again, reference numeral 12 denotes an audio-data transmitting means wherein, when audio data on a high resolution still picture is outputted from the data output node 3a of the aforementioned video/audio separator 3, the audio-data transmitting means 12 receives and outputs the audio data outputted from the data output node 3a of the video/audio separator 3, and wherein, audio data on a motion picture is outputted from the storage means 5, the audio-data transmitting means 12 receives and outputs the audio data outputted from the storage means 5.

This audio-data transmitting means 12 has an input node 12a connected to the data output node 3a of the video/audio separator 3 and the data input/output node 5a of the storage means 5 via a fourth data transmitting line 13. On the basis of an audio-data transmission enable signal SE inputted to a control node 12c, the audio-data transmitting means 12 outputs from an output node 12b audio data on the high resolution still picture inputted from the data output node 3a of the video/audio separator 3 to the aforementioned input node 12a, or audio data on the motion picture or still picture from the data input/output node 5a of the storage means 5.

The audio-data transmitting means 12 in this first embodiment comprises for example, a switching element such as a MOS transistor which is connected between the input node 12a and the output node 12b and receives the audio-data transmission enable signal SE at its control electrode.

Reference numeral 14 denotes an audio decoder which has an input node 14a connected to the output node 12b of the audio-data transmitting means 12 via a fifth data transmission line 15, decodes audio data inputted to the input node 14a and outputted from the aforementioned audio-data transmitting means 12, outputs this decoded audio decoded data to an output node 14b, and outputs the same to an audio-decoded data output terminal 17 via a sixth data output line 16.

Reference numeral 18 denotes a control means having a buffer control unit 18a which is provided with the following: a write address output means wherein, if the video data outputted from the data output node 3a of the video/audio separator 3 represents video data on the high resolution still picture, the write address output means 41 is activated upon receiving the write strobe signal WS from the video/audio separator 3 and the write enable signal WE, and outputs to the address signal input node 5b of the storage means 5 the write address signal WAD for the video data inputted from the data output node 3a of the video/audio separator 3 to the data input/output node 5a of the storage means 5; a read address output means 45 which is activated upon receiving the read strobe signal RS from the aforementioned video decoder 8 and the read enable signal RE, and outputs to the address signal input node 5c of the storage means 5 the read address signal RAD for the video data stored in the storage means 5 and outputted from the data input/output node 5a of the storage means 5 to the data input/output node 8a of the video decoder 8; and a buffer controller 49 which monitors a buffered amount of the video data on the high resolution still picture in the storage means 5, outputs the write enable signal WE to the write address output means 41, the reader 2, and the storage means 5 in accordance with the result of monitoring, and outputs the read enable signal RE to the read address output means 45, the video decoder 8, and the storage means 5.

The control means 18 outputs to the control node 12c of the audio-data transmitting means 12 the audio-data transmission enable signal SE, which sets the input node 12a and output node 12b of the audio-data transmitting means 12 in an energized state when the audio data on the high resolution still picture from the data output node 3a of the video/audio separator 3 or the audio data on the motion picture and the still picture from the data input/output node 5a of the storage means 5 is outputted, and which sets the input node 12a and output node 12b of the audio-data transmitting means 12 in a deenergized state at other times.

Since the control means 18 does not have a direct bearing upon the essence of the present invention, a detailed description thereof will not be given. However, the control means 18 outputs to the storage means 5 the write address signal WAD at the time when the audio data on the motion picture and still picture from the video/audio separator 3 is stored in the storage means 5, and the control means 18 outputs to the storage means 5 the read address signal RAD at the time when this stored audio data is outputted to the audio-data transmitting means 12. Further, the control means 18 outputs to the storage means 5 the write address signal WAD at the time when the decoded video data from the video decoder 8 is stored in the storage means 5, and the control means 18 outputs to the storage means 5 the read address signal RAD at the time when this decoded video data is outputted to the video decoder 8.

Then, the video/audio separator 3, the video decoder 8, the audio-data transmitting means 12, the audio decoder 14, and the control means 18 are formed into a single semiconductor integrated circuit device I, and the storage means 5 is formed as a 4M DRAM which is a single semiconductor integrated circuit device II. The single semiconductor integrated circuit device I comprising the video/audio separator 3, the video decoder 8, the audio-data transmitting means 12, the audio decoder 14, and the control means 18 may incorporate the storage means 5, and the video/audio decoding and reproducing apparatus may thus be formed by a single semiconductor integrated circuit device III.

Incidentally, in the first embodiment, since the data output node 3a of the video/audio separator 3, the data input/output node 5a of the storage means 5, and the data input/output node 8a of the video decoder 8 are connected by means of the first, second, and fourth data transmission lines 6, 10, and 13, when the video data is outputted from the data output node 3a of the video/audio separator 3, the data input/output node 8a of the video decoder 8 is set in a high-impedance state; when the video data on the high resolution still picture is outputted from the data output node 3a of the video/audio separator 3, the data input/output node 5a of the storage means 5 is set in the high-impedance state; and when the decoded video data is outputted from the data input/output node 8a of the video decoder 8 to the data input/output node 5a of the storage means 5 and when the decoded video data is outputted from the data input/output node 5a of the storage means 5 to the data input/output node 8a of the video decoder 8, the data output node 3a of the video/audio separator 3 is set in the high-impedance state.

In addition, the data input/output node 5a of the storage means 5 may be formed separately as a data input node and a data output node.

At this time, the data output node 3a of the video/audio separator 3 is connected to the data input node of the storage means 5. The data input/output node 8a of the video decoder 8 is also formed separately as a data input node and a data output node, and the data input node of the video decoder 8 is connected to the data output node of the storage means 5, and the data output node thereof to the data input node of the storage means 5.

The audio-data transmitting means 12 has a first input node connected to the data output node 3a of the video/audio separator 3 and a second input node connected to the data output node of the storage means 5. When the audio-data transmission enable signal SE enables transmission of the audio data on the motion picture and the still picture, the second input node and the output node of the audio-data transmitting means 12 are set in an energized state to output the audio data stored in the storage means 5 to the audio decoder 14. When the audio-data transmission enable signal SE enables transmission of the audio data on the high resolution still picture, the first input node and the output node of the audio-data transmitting means 12 are set in an energized state to output the audio data from the video/audio separator 3 to the audio decoder 14. At other times, the first input node, the second input node, and the output node of the audio-data transmitting means 12 are set in an deenergized state.

In this case, it suffices if the audio-data transmitting means 12 is comprised of a first MOS transistor connected between the first input node and the output node and receives the audio-data transmission enable signal SE at its control electrode, as well as a second MOS transistor connected between the second input node and the output node and receives the audio-data transmission enable signal SE at its control electrode.

Next, a description will be given of the operation of the video/audio decoding and reproducing apparatus which is configured as described above.

First, a description will be given of a case where the data which is read from the recording medium 1 is encoded video data and audio data on a motion picture.

When the reader 2 has read the data stream recorded on the recording medium 1 and is set in the writable state by the write enable signal WE, the reader 2 outputs the thus-read stream data to the video/audio separator 3 via a stream-data transmitting line 4. At this time, the stream data is read and outputted in a time series in the configuration shown in FIG. 2.

In addition, as shown in FIG. 3A, the control means 18 allots to the storage means 5 storage capacities in the video bit-stream area 7-1, the audio bit-stream area 7-2, and the decoded video data motion picture area 7-3 in the storage unit 7.

The video/audio separator 3 to which the data stream is inputted separates the video data and the audio data, respectively, from the stream data, outputs the separated video data and the audio data in a time series from the data output node 3a in a state of a bit stream, and outputs signals based on the pack header and the packet header (write strobe signal WS, identification signal HEAD, etc.). The control means 18 receives the signals based on the pack header and the packet header, obtains information as to what types of data have been inputted, and outputs various control signals in the form of signals based on the inputted pack header and the packet header to the reader 2, the storage means 5, the video decoder 8, the audio-data transmitting means 12, and the audio decoder 14.

Upon receiving the write enable signal WE indicating a write-enabled state, which is a control signal from the control means 18, the storage means 5 is set in a writable state, and temporarily stores the data inputted thereto from the data output node 3a of the video/audio separator 3 via the first data transmission line 6 and the data input/output node 5a at the address based on the write address signal WAD, which is a control signal from the control means 18. If the data inputted to the data input/output node 5a is the video data, it is stored in the video bit-stream area 7-1 of the storage unit 7, and if it is the audio data, it is stored in the audio bit-stream area 7-2. At this time, since the data input/output node 8a of the video decoder 8 is set in the high-impedance state, the data input/output node 8a of the video decoder 8 does not affect the video/audio separator 3 and the storage means 5.

Next, the video decoder 8 operates in such a manner as to start decoding on the basis of a control signal from the control means 18 using the signal based on the decoding-time management information in the packet header. At this time, the storage means 5 also operates in such a manner as to start decoding by means of the just-mentioned control signal.

That is, upon receiving the read enable signal RE indicating a read-enabled state, which is a control signal from the control means 18, the storage means 5 is set in a readable state, and outputs from its data input/output node 5a the video data stored temporarily at the address based on the read address signal RAD which is a control signal from the control means 18.

The video data outputted from the data input/output node 5a of the storage means 5 is inputted to the video decoder 8 via the second data transmission line 10 and the data input/output node 8a.

The video decoder 8 is controlled by the host bus interface HIF for effecting exchange of control signals to and from the control means 18. The video data inputted to the data input/output node 8a is inputted to the variable-length decoder VLD 27 as video data of a predetermined number of bits via the DRAM interface DIF 25 and the buffer 26. If this inputted video data is the video data on the I picture, the variable-length decoder VLD 27 effects predetermined processing, and outputs the same to the inverse quantizer IQ 28 as a decoded signal.

This decoded signal is subjected to predetermined processing by the inverse quantizer IQ 28, the inverse zigzag transformer $ZZ^{-1}$ 29, the inverse discrete cosine transformer IDCT 30, and the reconstructor RECON 31, and is outputted as the decoded video data on the I picture from the reconstructor RECON 31 to the storage means 5 via the transmission line 10c, the DRAM interface DIF 25, and the second data transmission line 10. At this time, upon receiving the write enable signal WE indicating a write-enabled state, which is the control signal from the control means 18, the storage means 5 is set in the writable state, and temporarily stores the decoded video data inputted thereto from the video decoder 8 via the data input/output node 5a at the address based on the write address signal WAD, which is the control signal from the control means 18. The decoded video data which is temporarily stored is stored in the decoded video data motion picture area 7-3 in the storage unit 7 of the storage means 5.

On the other hand, if the video data inputted to the variable-length decoder VLD 27 is the video data on the P picture and the video data on the B picture, the variable-length decoder VLD 27 effects predetermined processing, outputs the same to the inverse quantizer IQ 28 as a decoded signal, and outputs the decoded signal also to the motion-compensation circuit 25a of the DRAM interface DIF 25 via the transmission line 10b.

The motion-compensation circuit 25a effects a vector transformation on the basis of the decoded signal inputted thereto, and an address for the decoded video data on the I picture (and the decoded video data on the P picture) corresponding to the signal decoded by an address counter and stored temporarily in the storage means 5.

The decoded signal from the variable-length decoder VLD 27 is subjected to predetermined processing by the inverse quantizer IQ 28, the inverse zigzag-transformer $ZZ^{-1}$ 29, and the inverse discrete cosine transformer IDCT 30, and is outputted from the inverse discrete cosine transformer IDCT 30 to the reconstructor RECON 31 as decoded pixel data.

As shown in FIG. 5, this reconstructor RECON 31 outputs decoded video data to the storage means 5 via the transmission line 10c, the DRAM interface DIF 25, and the second data transmission line 10 as the decoded video data on the P picture (or the decoded video data on the B picture) based on the differential data based on the decoded pixel data from the inverse discrete cosine transformer IDCT and the decoded video data on the I picture (and the decoded video data on the P picture) inputted from the storage means 5 via the second data transmission line 10, the DRAM interface DIF 25, and the transmission line 10d.

At this time, the inputting to the reconstructor RECON 31 of the decoded video data on the I picture (and the decoded video data on the P picture) stored temporarily in the storage means 5 is effected as the storage means 5 is set in the writable state upon receiving the write enable signal WE indicating the write-enabled state, which is the control signal from the control means 18, and the decoded video data on the I picture (and the decoded video data on the P picture) stored temporarily at the address based on the read address signal from the motion-compensation circuit 25a is read. In addition, when the decoded video data on the P picture (or the decoded video data on the B picture) generated by the reconstructor RECON 31 is outputted to the storage means 5, upon receiving the write enable signal WE indicating the write-enabled state, which is the control signal from the control means 18, the storage means 5 is set in the writable state, and temporarily stores the decoded video data inputted thereto from the video decoder 8 via the data input/output node 5a at the address based on the write address signal WAD, which is the control signal from the control means 18. The decoded video data which is temporarily stored is stored in the decoded video data motion picture area 7-3 in the storage unit 7 of the storage means 5.

In the above-described manner, the decoded video data decoded by the video decoder 8 is temporarily stored in the storage means 5.

Subsequently, a control signal for reproduction and output is outputted by the control means 18 when a coincidence is obtained between the signal based on the information on management of the timing of reproduction and output, which is located in the packet header, and a system clock reference value. As for the video decoder 8 which has received the control signal for reproduction and output from the control means 18, the display system interface PIF 32 reads at predetermined timings the decoded video data on the I picture, the P picture, and the B picture inputted respectively from the storage means 5 via the second data transmission line 10, the DRAM interface DIF 25, and the transmission line 10e, effects generally known predetermined processing, and outputs the processed video data to the decoded video data output terminal 9 via the transmission line 10f, the decoded-data output node 8b, and the third data transmission line 11 as video display data based on the decoded video data which has been read.

While the exchange of data is being carried out between the storage means 5 and the video decoder 8, since the data output node 3a of the video/audio separator 3 is set in the high-impedance state, the data output node 3a of the video/audio separator 3 does not affect the storage means 5 and the video decoder B.

In the above-described manner, the decoded video data decoded by the video decoder 8 is temporarily stored in the storage means 5, and the temporarily stored decoded video data is outputted to the decoded video data output terminal 9. The relationship between the decoding order and display-ing order is shown in FIG. 6.

Namely, encoded video data 1 [I] on a first display video (video data on the I picture) is first decoded, and is stored in the decoded video data motion picture area 1 in the storage unit of the storage means 5.

Next, encoded video data 4 [P] on a fourth display video (video data on the P picture) is decoded by referring to the decoded video data 1 [I] on the first display video, and is stored in the decoded video data motion picture area 2 in the storage unit of the storage means 5. When the decoding of the video data 4 [P] is finished, the decoded video data 1 [I] is read from the storage means 5, and is outputted to the decoded video data output terminal 9.

Next, encoded video data 2 [B] on a second display video (video data on the B picture) is decoded by referring to the decoded video data 1 [I] on the first display video and the decoded video data 4 [P] on the fourth display video, and is stored in the decoded-video-data motion picture area 3 in the storage unit of the storage means 5. When the decoding of the video data 2 [B] is finished, the decoded video data 2 [B] is read from the storage means 5, and is outputted to the decoded video data output terminal 9.

Next, encoded video data 3 [B] on a third display video (video data on the B picture) is decoded by referring to the decoded video data 1 [I] on the first display video and the decoded video data 4 [P] on the fourth display video, and is stored in the decoded-video-data motion picture area 3 in the storage unit of the storage means 5. When the decoding of the video data 3 [B] is finished, the decoded video data 3 [B] is read from the storage means 5, and is outputted to the decoded-video data output terminal 9.

Incidentally, in FIG. 6, although display is given in such a way that the decoded video data 2 [B] and the decoded video data 3 [B] are stored temporarily in the decoded-video-data motion picture area 3 in an overlapping manner, these two items of data are shown overlapping to facilitate an understanding for convenience' sake. In reality, after the decoded video data 2 [B] is temporarily stored and is read, the decoded video data 3 [B] is temporarily stored, and there is no state where the two are stored simultaneously. The same holds true of the subsequent procedure.

Next, encoded video data 7 [P] on a seventh display video (video data on the P picture) is decoded by referring to the decoded video data 4 [P] on the fourth display video, and is stored in the decoded-video-data motion picture area 1 in the storage unit of the storage means 5.

Next, encoded video data 5 [B] on a fifth display video (video data on the B picture) is decoded by referring to the decoded video data 4 [P] on the fourth display video and the decoded video data 7 [P] on the seventh display video, and is stored in the decoded-video-data motion picture area 3 in the storage unit of the storage means 5. When the decoding of the video data 5 [B] is finished, the decoded video data 5 [B] is read from the storage means 5, and is outputted to the decoded-video data output terminal 9.

Next, encoded video data 6 [B] encoded on a sixth display video (video data on the B picture) is decoded by referring to the decoded video data 4 [P] on the fourth display video and the decoded video data 7 [P] on the seventh display video, and is stored in the decoded-video-data motion picture area 3 in the storage unit of the storage means 5. When the decoding of the video data 6 [B] is finished, the video decoded data 6 [B] is read from the storage means 5, and is outputted to the decoded video data output terminal 9.

Next, encoded video data 10 [P] on a 10th display video (video data on the P picture) is decoded by referring to the decoded video data 7 [P] on the seventh display video, and is stored in the decoded-video-data motion picture area 2 in the storage unit of the storage means 5. When the decoding of the video data 10 [P] is finished, the decoded video data 7 [P] is read from the storage means 5, and is outputted to the decoded video data output terminal 9.

Thereafter, video data is decoded and decoded video data is outputted in a similar manner.

Meanwhile, control signals from the control means 18 for reproduction and output are imparted to the audio/data transmitting means 12 and the audio decoder 14 as well. The audio/data transmitting means 12 receives the audio data outputted from the storage means 5, and transmits the same to the audio decoder 14 by being controlled by the audio-data transmission enable signal SE which is a control signal from the control means 18 for reproduction and output.

The audio decoder 14 decodes the audio data outputted from the audio/data transmitting means 12 by being controlled by a control signal from the control means 18 for reproduction and output, outputs the decoded audio decoded data to the output node 14b, and outputs the same to the audio-decoded data output terminal 17 via the sixth data output line 16.

Since the audio decoder 14 is controlled by the control signal for reproduction and output, which is based on the information on management of the timing of reproduction and output, which is located in the packet header, in the same way as the video decoder 8, the audio decoded data outputted from the audio decoder 14 is outputted in synchronism with the decoded video data outputted from the video decoder 8, so that the video and the audio are reproduced in conformity with each other.

Next, a description will be given of a case where the data which is read from the recording medium 1 is the encoded video data and audio data on a still picture. Also in the case where the video data and audio data concern a still picture, the operation is carried out in a manner similar to that of the case concerning a motion picture, particularly a motion picture on the I picture, a description will be given only of an outline hereafter.

That is, the data stream recorded on the recording medium 1 and read by the reader 2 is inputted to the video/audio separator 3.

In addition, as shown in FIG. 3B, the control means 18 allots to the storage means 5 storage capacities in the video bit-stream area 7-1, the audio bit-stream area 7-2, and the decoded-video-data motion picture area 7-3 in the storage unit 7.

The video/audio separator 3 to which the data stream is inputted separates the video data and the audio data, respectively, from the stream data, outputs the separated video data and the audio data in a time series from the data output node 3a in a state of a bit stream, and outputs signals based on the pack header and the packet header (write strobe signal WS, identification signal HEAD, etc.).

Upon receiving the write enable signal WE indicating a write-enabled state, which is a control signal from the control means 18, the storage means 5 is set in a writable state, and temporarily stores the data from the video/audio separator 3 at the address based on the write address signal WAD, which is a control signal from the control means 18. If the inputted data is the video data, it is stored in the video bit-stream area 7-1 of the storage unit 7, and if it is the audio data, it is stored in the audio bit-stream area 7-2.

Next, the video decoder 8 operates in such a manner as to start decoding on the basis of a control signal from the control means 18 using the signal based on the decoding-time management information in the packet header. At this time, the storage means 5 also operates in such a manner as to start decoding by means of the just-mentioned control signal.

The video data outputted from the data input/output node 5a of the storage means 5 is inputted to the video decoder 8.

In the video decoder 8, the video data is inputted to the variable-length decoder VLD 27 as video data of a predetermined number of bits via the DRAM interface DIF 25 and the buffer 26. Predetermined processing is effected by the variable-length decoder VLD 27, the inverse quantizer IQ 28, the inverse zigzag transformer $ZZ^{-1}$ 29, the inverse discrete cosine transformer IDCT 30, and the reconstructor RECON 31, and the decoded signal is outputted as the decoded video data on the still picture from the reconstructor RECON 31 to the storage means 5 via the DRAM interface DIF 25. At this time, upon receiving the write enable signal WE indicating a write-enabled state, which is the control signal from the control means 18, the storage means 5 is set in the writable state, and temporarily stores the decoded video data from the video decoder 8 via the data input/output node 5a at the address based on the write address signal WAD, which is the control signal from the control means 18. The decoded video data which is temporarily stored is stored in the decoded-video-data still picture area 7-3 in the storage unit 7 of the storage means 5.

In the above-described manner, the decoded video data decoded by the video decoder 8 is temporarily stored in the storage means 5.

Subsequently, a control signal for reproduction and output is outputted by the control means 18 when a coincidence is obtained between the signal based on the information on management of the timing of reproduction and output, which is located in the packet header, and a system clock reference value. As for the video decoder 8 which has received the control signal for reproduction and output from the control means 18, the display system interface PIF 32 reads at predetermined timings the decoded video data on the still picture inputted from the storage means 5 via the DRAM interface DIF 25, and outputs the processed video data to the decoded-video data output terminal 9 as video display data.

Meanwhile, control signals from the control means 18 for reproduction and output are imparted to the audio/data transmitting means 12 and the audio decoder 14 as well. The audio/data transmitting means 12 receives the audio data outputted from the storage means 5, and transmits the same to the audio decoder 14 by being controlled by the audio-data transmission enable signal SE which is a control signal from the control means 18 for reproduction and output.

The audio decoder 14 decodes the audio data outputted from the audio/data transmitting means 12 by being controlled by a control signal from the control means 18 for reproduction and output, outputs the decoded audio decoded data to the output node 14a, and outputs the same to the audio-decoded data output terminal 17 via the sixth data output line 16.

Since the audio decoder 14 is controlled by the control signal for reproduction and output, which is based on the information on management of the timing of reproduction and output, which is located in the packet header, in the same way as the video decoder 8, the decoded audio data outputted from the audio decoder 14 is outputted in synchronism with the decoded video data outputted from the video decoder 8, so that the video and the audio are reproduced in conformity with each other.

Next, a description will be given of a case where the data which is read from the recording medium 1 is the encoded video data and audio data on a high resolution still picture. Also in the case where the video data and audio data concern a high resolution still picture, the operation is basically carried out in a manner similar to that of the case concerning a still picture, a description will be given hereafter only of an outline centering on differences.

That is, the data stream recorded on the recording medium 1 and read by the reader 2 is inputted to the video/audio separator 3.

In addition, as shown in FIG. 3C, the control means 18 allots to the storage means 5 storage capacities in the video bit-stream area 7-1 and the decoded-video-data high resolution still picture area 7-3 in the storage unit 7. The audio bit-stream area 7-2 is not allotted. Moreover, the buffer control unit 18a of the control means 18 monitors the amount of video data written in, with respect to the storage capacity allotted to the video bit-stream area 7-1 of the storage unit 7. If the amount of data written in is less than a prescribed amount, the buffer control unit 18a outputs the write enable signal WE indicating a writable state to the reader 2 so as to let the reader 2 to output the stream data, whereas if the amount of data written in reaches a prescribed amount or more, the buffer control unit 18a sets the write enable signal WE in a disabled state so as to stop the outputting of the stream data from the reader 2.

In addition, the control means 18 controls the clock for the video/audio separator 3 and the storage means 5 so that the speed at which the video data and audio data for the high resolution still picture are written into the storage means 5 from the video/audio separator 3 becomes slower than the speed at which the video data and audio data for the motion picture are written into the storage means 5 from the video/audio separator 3. Consequently, even if the storage capacity allotted to the video bit-stream area 7-1 of the storage unit 7 is small for the motion picture, decoding can be effected without a problem.

The video/audio separator 3 to which the data stream is inputted separates the video data and the audio data, respectively, from the stream data, outputs the separated video data and the audio data serially in time from the data output node 3a in a state of a bit stream, and outputs signals based on the pack header and the packet header (write strobe signal Ws, identification signal HEAD, etc.).

If the data from the video/audio separator 3 is video data, upon receiving the write enable signal WE indicating a write-enabled state, which is a control signal from the control means 18, the storage means 5 is set in a writable state, and temporarily stores the video data from the video/ audio separator 3 at the address (video bit-stream area 7-1 of the storage unit 7) based on the write address signal WAD, which is a control signal from the control means 18.

If the data from the video/audio separator 3 is audio data, the data input/output node 5a of the storage means 5 is set in the high-impedance state by the control signal from the control means 18, and is therefore set neither in the readable state nor in the writable state.

At this time, the control means 18 outputs to the audio-data transmitting means 12 the audio-data transmission enable signal SE indicating a state in which the transmission of audio data is enabled, thereby allowing the audio data from the video/audio separator 3 to be transmitted to the audio decoder 14.

The video decoder 8 operates in such a manner as to start decoding on the basis of a control signal from the control means 18 using the signal based on the decoding-time management information in the packet header. At this time, the storage means 5 also operates in such a manner as to start decoding by means of the just-mentioned control signal.

The video data outputted from the data input/output node 5a of the storage means 5 is inputted to the video decoder 8.

In the video decoder 8, the video data is inputted to the variable-length decoder VLD 27 as video data of a predetermined number of bits via the DRAM interface DIF 25 and the buffer 26. Predetermined processing is effected by the variable-length decoder VLD 27, the inverse quantizer IQ 28, the inverse zigzag transformer $ZZ^{-1}$ 29, the inverse discrete cosine transformer IDCT 30, and the reconstructor RECON 31, and the decoded signal is outputted as the decoded video data on the high resolution still picture from the reconstructor RECON 31 to the storage means 5 via the DRAM interface DIF 25. At this time, upon receiving the write enable signal WE indicating a write-enabled state, which is the control signal from the control means 18, the storage means 5 is set in the writable state, and temporarily stores the decoded video data from the video decoder 8 via the data input/output node 5a at the address based on the write address signal WAD, which is the control signal from the control means 18. The decoded video data which is temporarily stored is stored in the decoded-video-data high resolution still picture area 7-3 in the storage unit 7 of the storage means 5.

In the above-described manner, the decoded video data decoded by the video decoder 8 is temporarily stored in the storage means 5.

Subsequently, as for the video decoder 8 which has received the control signal for reproduction and output from the control means 18, the display system interface PIF 32 reads at predetermined timings the decoded video data on the high resolution still picture inputted from the storage means 5 via the DRAM interface DIF 25, and outputs the processed video data to the decoded-video data output terminal 9 as video display data.

Meanwhile, the audio decoder 14 decodes the audio data outputted from the video/audio separator 3 and inputted via the audio-data transmitting means 12, outputs the decoded audio data to the output node 14b, and outputs the same to the decoded audio data output terminal 17 via the sixth data output line 16.

The timing at which the decoded audio data is outputted from the decoder audio 14 to the audio-decoded data output terminal 17 and the timing at which the decoded video data is outputted from the video decoder 8 to the video-data output terminal 9 are not synchronized with each other, and a slight time lag is present therebetween. However, since the video is a still picture, no discomfort is imparted to the viewer.

With the video/audio decoding and reproducing apparatus configured as above, there are advantages in that the motion picture and the high resolution still picture can be decoded, and that it is possible to make effective use of the storage capacity of the storage means 5 used at the time of decoding the video data.

That is, there is an advantage in that it is possible to decode even the high resolution still picture by using the storage means 5 having a necessary and sufficient storage capacity for the motion picture, e.g., it is possible to decode even the high resolution still picture by using only one 4M DRAM as the storage means 5.

(Second Embodiment)

FIG. 7 shows a second embodiment of the present invention. This second embodiment differs from the first embodiment only in the buffer control unit 18a of the control means 18 for controlling the timings at which the video data on the high resolution still picture is stored in the storage means 5 from the video/audio separator 3, and the stored video data is outputted to the video decoder 8, and the other aspects are the same. Accordingly, the buffer control unit 18a of the control means 18 is shown in FIG. 7, and this aspect will be mainly described.

In FIG. 7, reference numeral 18a denotes the buffer control unit of the control means 18, which is provided with the following: the write address output means 41 which is activated upon receiving the write strobe signal WS inputted thereto from the video/audio separator 3 via a signal transmission line 42 and the write enable signal WE inputted thereto via a signal transmission line 43, and outputs to the address signal input node 5b of the storage means 5 via a transmission line 44 the write address signal WAD for the video data on the high resolution still picture inputted from the data output node 3a of the video/audio separator 3 to the data input/output node 5a of the storage means 5; the read address output means 45 which is activated upon receiving the read strobe signal RS inputted thereto from the video decoder 8 via a signal transmission line 46 and the read enable signal RE inputted thereto via a signal transmission line 47, and outputs to the address signal input node 5c of the storage means 5 the read address signal RAD for the video data on the high resolution still picture stored in the storage means 5 and outputted from the data input/output node 5a of the storage means 5 to the data input/output node 8a of the video decoder 8; and the buffer controller 49 which outputs the write enable signal WE to the aforementioned write address output means 41, the reader 2, and the storage means 5 via the signal transmission line 43 on the basis of the write address signal WAD from the write address output means 41 and the read address signal RAD from the read address output means 45, and outputs the read enable signal RE to the read address output means 45, the video decoder 8, and the storage means 5 via the signal transmission line 47.

The aforementioned write address output means 41 is constituted by an address counter which is activated upon receiving the write strobe signal WS and the write enable signal WE, outputs the write address signal WAD which is incremented on the basis of an inputted clock signal (not shown), and resets the write address signal WAD on the basis of an inputted reset signal (not shown).

The aforementioned read address output means 45 is constituted by an address counter which is activated upon receiving the read strobe signal RS and the read enable signal RE, outputs the read address signal RAD which is incremented on the basis of an inputted clock signal (not shown), and resets the read address signal RAD on the basis of an inputted reset signal (not shown).

As shown in FIG. 8, the aforementioned buffer controller 49 is comprised of a subtracter 51 which subtracts the read address signal RAD outputted from the read address output means 45 from the write address signal WAD outputted from the write address output means 41, and outputs the result of subtraction; a comparator 52 wherein, when the result of subtraction from the subtracter 51 is in a decreasing direction, the comparator 52 compares the result of subtraction with a first comparison value, and if the result of subtraction from the subtracter 51 is smaller than the first comparison value, the comparator 52 outputs the write enable signal WE indicating that writing is enabled, whereas when the result of subtraction from the subtracter 51 is in an increasing direction, the comparator 52 compares the result of subtraction with a second comparison value smaller than the first comparison value, and if the result of subtraction from the subtracter 51 becomes greater than or equal to the second comparison value, the comparator 52 outputs the write enable signal WE indicating that writing is enabled; and an inverter 53 which inverts an output from the comparator 52, wherein when the result of subtraction from the subtracter 51 is in a decreasing direction, the inverter 53 outputs the read enable signal RE indicating that reading is enabled if the result of subtraction becomes greater than or equal to the first comparison value, whereas when the result of subtraction from the subtracter 51 is in an increasing direction, the inverter 53 compares the result of subtraction with the second comparison value, and if the result of subtraction from the subtracter 51 is less than the second comparison value, the inverter 53 outputs the read enable signal WE indicating that reading is enabled.

The control means 18 outputs to the control node 12c of the audio-data transmitting means 12 the audio-data transmission enable signal SE, which sets the input node 12a and output node 12b of the audio-data transmitting means 12 in an energized state when the audio data on the high resolution still picture from the data output node 3a of the video/audio separator 3 or the audio data on the motion picture and the still picture from the data input/output node 5a of the storage means 5 is outputted, and which sets the input node 12a and output node 12b of the audio-data transmitting means 12 in a deenergized state at other times.

Incidentally, since the control means 18 does not have a direct bearing upon the essence of the present invention, a detailed description thereof will not be given. However, the control means 18 outputs to the storage means 5 the write address signal WAD at the time when the audio data on the motion picture and still picture from the video/audio separator 3 is stored in the storage means 5, and the control means 18 outputs to the storage means 5 the read address signal RAD at the time when this stored audio data is outputted to the audio-data transmitting means 12. Further, the control means 18 outputs to the storage means 5 the write address signal WAD at the time when the decoded video data from the video decoder 8 is stored in the storage means 5, and the control means 18 outputs to the storage means 5 the read address signal RAD at the time when this decoded video data is outputted to the video decoder 8.

Next, a description will be given of the operation of the video/audio decoding and reproducing apparatus which is configured as described above. In this second embodiment, the decoding operation with respect to the motion picture and the still picture is utterly the same as that of the first embodiment, so that a description thereof will be omitted.

In addition, with respect to the decoding of the high resolution still picture as well, only the method in which the video data is stored in the video bit-stream area 7-1 in the storage unit 7 of the storage means 5 from the video/audio separator 3, and the stored data is outputted to the video decoder 8 differs from that of the first embodiment, and the other aspects are similar. Hence, a description will be given hereafter only of an outline centering on differences.

That is, the stream data recorded on the recording medium 1 and read by the reader 2 is inputted to the video/audio separator 3.

In addition, as shown in FIG. 3C, the control means 18 allots to the storage means 5 storage capacities in the video bit-stream area 7-1 and the decoded-video-data high resolution still picture area 7-3 in the storage unit 7. The audio bit-stream area 7-2 is not allotted.

Moreover, the buffer control unit 18a of the control means 18 outputs the write enable signal WE, the read enable signal RE, the write address signal WAD, and the read address signal RAD to the storage means 5.

Specifically, the write address output means 41 is activated upon receiving the write strobe signal WS from the video/audio separator 3 and the write enable signal WE from the buffer controller 49, and outputs to the storage means 5 the write address signal WAD which is incremented on the basis of an inputted clock signal (not shown). This state continues while, in the buffer control unit 49, the subtracter 51 subtracts the read address signal RAD outputted from the read address output means 45 from the write address signal WAD outputted from the write address output means 41, and the comparator 52 outputs the write enable signal WE indicating that writing is enabled if the result of subtraction is less than the first comparison value, allowing the video/audio separator 3 to output the video data on the high resolution still picture.

When the result of subtraction from the subtracter 51 becomes greater than or equal to the first comparison value, and the read enable signal RE indicating that reading is enabled is outputted from the comparator 52, the reader 2 is controlled by the write enable signal WE indicating that writing is inhibited so that the data on the high resolution still picture will not be outputted from the reader 2 to the video/audio separator 3, and the data output node 3a of the video/audio separator 3 is set in the high-impedance state. Then, since the storage means 5 is set in a reading-enabled state, the video data stored in the video bit-stream area 7-1 of the storage unit 7 can be read by the video decoder 8. Since the read address output means 45 outputs the read address signal RAD which is incremented on the basis of an inputted clock signal (not shown), when the video data is read from the storage means 5, and the result of subtraction from the subtracter 51 becomes gradually small and reaches the second comparison value or less, the write-enable signal WE indicating that writing is enabled is outputted again from the comparator 52. Thus, the buffer control unit 18a of the control means 18 controls the writing of video data into the storage means 5 and the reading of video data from the storage means 5 by means of the write address signal WAD and the read address signal RAD.

Incidentally, in the control means 18, the speed at which the video data and audio data on the high resolution still picture are written from the video/audio separator 3 into the storage means 5 is set to be identical to the speed at which the video data and audio data on the motion picture are written from the video/audio separator 3 into the storage means 5 unlike the above-described first embodiment. Even if these speeds are set to be identical, since the buffer control unit 18a of the control means 18 controls the writing of video data into the storage means 5 and the reading of video data from the storage means 5 by means of the write address signal WAD and the read address signal RAD, decoding can be effected without a problem.

If the data from the video/audio separator 3 is video data, the storage means 5 is set in a writable state upon receiving the write enable signal WE indicating a writing-enabled state, which is a control signal from the control means 18, and the storage means 5 temporarily stores the video data from the video/audio separator 3 at the address (video bit-stream area 7-1 of the storage unit 7) based on the write address signal WAD which is a control signal from the control means 18.

If the data from the video/audio separator 3 is audio data, the data input/output node 5a of the storage means 5 is set in the high-impedance state by the control signal from the control means 18, and is therefore set neither in the readable state nor in the writable state.

At this time, the control means 18 outputs to the audio-data transmitting means 12 the audio-data transmission enable signal SE indicating a state in which the transmission of audio data is enabled, thereby allowing the audio data from the video/audio separator 3 to be transmitted to the audio decoder 14.

The video decoder 8 operates in such a manner as to start decoding on the basis of a control signal from the control means 18 using the signal based on the decoding-time management information in the packet header. At this time, the storage means 5 also operates in such a manner as to start decoding by means of the just-mentioned control signal.

The video data outputted from the data input/output node 5a of the storage means 5 is inputted to the video decoder 8.

In the video decoder 8, the video data is inputted to the variable-length decoder VLD 27 as video data of a predetermined number of bits via the DRAM interface DIF 25 and the buffer 26. Predetermined processing is effected by the variable-length decoder VLD 27, the inverse quantizer IQ 28, the inverse zigzag transformer $ZZ^{-1}$ 29, the inverse discrete cosine transformer IDCT 30, and the reconstructor RECON 31, and the decoded signal is outputted as the decoded video data on the high resolution still picture from the reconstructor RECON 31 to the storage means 5 via the DRAM interface DIF 25. At this time, upon receiving the write enable signal WE indicating a write-enabled state, which is the control signal from the control means 18, the storage means 5 is set in the writable state, and temporarily stores the decoded video data from the video decoder 8 via the data input/output node 5a at the address based on the write address signal WAD, which is the control signal from the control means 18. The decoded video data which is temporarily stored is stored in the decoded-video-data high resolution still picture area 7-3 in the storage unit 7 of the storage means 5.

In the above-described manner, the decoded video data decoded by the video decoder 8 is temporarily stored in the storage means 5.

Subsequently, as for the video decoder 8 which has received the control signal for reproduction and output from the control means 18, the display system interface PIF 32 reads at predetermined timings the decoded video data on the high resolution still picture inputted from the storage means 5 via the DRAM interface DIF 25, and outputs the processed video data to the decoded-video data output terminal 9 as video display data.

Meanwhile, the audio decoder 14 decodes the audio data outputted from the video/audio separator 3 and inputted via the audio/data transmitting means 12, outputs the decoded audio data to the output node 14a, and outputs the same to the decoded audio data output terminal 17 via the sixth data output line 16.

The timing at which the decoded audio data is outputted from the audio decoder 14 to the audio-decoded data output terminal 17 and the timing at which the decoded video data is outputted from the video decoder 8 to the video-data output terminal 9 are not synchronized with each other, and a slight time lag is present therebetween. However, since the video is a still picture, no discomfort is imparted to the viewer.

With the video/audio decoding and reproducing apparatus configured as above, in addition to advantages similar to those of the first embodiment, it is possible to obtain an advantage in that the storage of video data for the high resolution still picture in the video bit-stream area 7-1 in the storage unit 7 of the storage means 7 can be effected accurately with high precision.

What is claimed is:

1. A video/audio decoding and reproducing device comprising:

storage means for temporarily storing encoded motion picture video and encoded motion picture audio data when said decoding and reproducing device receives encoded video and audio data for a motion picture;

a video decoder for decoding the encoded motion picture video data stored in said storage means, said storage means temporarily storing the motion picture video data decoded by said video decoder; and an audio decoder for decoding the encoded motion picture audio data stored in said storage means, said storage means temporarily storing encoded still picture video data when said decoding and reproducing device receives encoded still picture video and encoded still picture audio data for a high resolution still picture, said video decoder decoding the encoded still picture video data stored in said storage means, said storage means temporarily storing the still picture video data decoded by said video decoder, said audio decoder decoding the encoded still picture audio data without first temporarily storing the encoded still picture audio data in said storage means, and said storage means temporarily storing the still picture video data decoded by said video decoder.

2. The video/audio decoding and reproducing device according to claim 1 comprising:

a decoded video data output terminal outputting video display data based on the decoded video data stored temporarily in said storage means; and a decoded audio data output terminal outputting the decoded audio data decoded by said audio decoder.

3. The video/audio decoding and reproducing device according to claim 1 comprising means for detecting the amount of video data stored temporarily in said storage means, said storage means receiving encoded video data according to the amount of video data stored temporarily.

4. The video/audio decoding and reproducing device according to claim 3 wherein said means for detecting the amount of video data stored temporarily in said storage means detects an address signal for the video data input to said storage means and an address signal for the video data output from said storage means.

5. A video/audio decoding and reproducing device comprising:

a video/audio separator having a data input node and receiving a first packet having a first packet header and encoded video data, and a second packet having a second packet header and encoded audio data as a data stream, serially in time, for separating the encoded video data and the encoded audio data from the data stream, respectively, and for outputting the separated encoded video data and the separated encoded audio data from the data output node, serially in time;

storage means having a data input node connected to the data output node of said video/audio separator, for temporarily storing the separated encoded video data and the separated encoded audio data and outputting data temporarily stored from a data output node;

a video decoder having a video decoder data output terminal, for decoding the encoded video data temporarily stored in said storage means, outputting the decoded video data to said storage means, and for outputting video display data based on the decoded video data temporarily stored in said storage means and output from the data output node of said storage means, to the video decoder data output terminal;

audio-data transmitting means connected to the data output node of said video/audio separator and the data output node of said storage means, for receiving and outputting the encoded audio data received from the data output node of said video/audio separator if the encoded audio data received from the data output node of said video/audio separator, without first temporarily storing the encoded audio data in said storage means, is encoded audio data for a high resolution still picture, and for receiving and outputting the encoded audio data received from the data output node of said storage means if the encoded audio data received from the data output node of said storage means is encoded audio data for a motion picture; and an audio decoder for decoding the encoded audio data received from said audio-data transmitting means and outputting the decoded audio data to a decoded audio data output terminal.

6. The video/audio decoding and reproducing device according to claim 5 wherein the data input node and the data output node of said storage means are the same node.

7. The video/audio decoding and reproducing device according to claim 5 comprising control means including:

write address output means for outputting a write address signal for the encoded video data for a high resolution still picture input from the data output node of said video/audio separator to the data input node of said storage means;

read address output means for outputting a read address signal for the encoded video data for the high resolution still picture temporarily stored in said storage means; and a buffer controller outputting a write enable signal and a read enable signal based on the write address signal from said write address output means and the read address signal from said read address output means wherein said storage means, in response to the write address signal, the write enable signal, the read address signal, and the read enable signal from said control means, is set in a state for storing data, and stores the encoded video data for the high resolution still picture input to the data input node, is set in a state for outputting stored data according to the received read enable signal, and outputs the encoded video data for the high resolution still picture based on a read address signal at the data output node.

8. The video/audio decoding and reproducing device according to claim 7 wherein the read enable signal is an inverted write enable signal.

9. The video/audio decoding and reproducing device according to claim 7, wherein the write enable signal and the read enable signal comprise an enable signal having first and second values, the first value representing the write enable signal, and the second value representing the read enable signal.

10. A video/audio decoding and reproducing device comprising:

a video/audio separator having a data input node and receiving a first packet having a first packet header and encoded video data, and a second packet having a second packet header and encoded audio data as a data stream serially in time, for separating the encoded video data and the encoded audio data from the data stream, and for outputting the separated encoded video data and the separated encoded audio data from a data output node, serially in time;

storage means having a data input/output node connected to the data output node of said video/audio separator, an address signal input node receiving a write address signal and a read address signal, an enable signal input node receiving a write enable signal and a read enable signal, and a storage unit for temporarily storing the data received from said data input/output node at an address based on the write address signal received by said address signal input node if the write enable signal is received by the enable signal input node and the write address signal is received by the address signal input node, and reading the data stored at an address based on the read address signal received by said address signal input node and output to said data input/output node if the read enable signal is received by said enable signal input node and the read address signal is received by said address signal input node;

a video decoder for decoding the encoded video data received from the data input/output node of said storage means, outputting the decoded video data to the data input/output node of said storage means, and outputting video display data based on the decoded video data, received from the data input/output node of said storage means, to a video decoder data output terminal;

audio-data transmitting means having an input node connected to the data output node of said video/audio separator and the data input/output node of said storage means, for outputting the encoded audio data received at the input nodes, without first temporarily storing the encoded audio data in said storage means, in response to an audio-data transmission enable signal; and an audio decoder for decoding the encoded audio data received from the output node of said audio-data transmitting means and outputting the decoded audio decoded data to an audio decoder data output terminal.

11. The video/audio decoding and reproducing device according to claim 10 comprising control means including:

write address output means for outputting the write address signal to the address signal input node of said storage means;

read address output means for outputting the read address signal to the address signal input node of said storage means; and a buffer controller outputting the write enable signal and the read enable signal based on the write address signal from said write address output means and the read address signal from said read address output means to the enable signal input node of said storage means.

12. A video/audio decoding and reproducing device comprising:

a video/audio separator having a data input node and receiving a first packet having a first packet header and encoded video data, and a second packet having a second packet header and encoded audio data as a data stream, serially in time, for separating the encoded video data and the encoded audio data from the data stream, and for outputting the separated encoded video data and the separated encoded audio data from a data output node, serially in time;

a video decoder having an input/output node connected to the input/output node of a storage means, for decoding the encoded video data received at the input/output node, outputting the decoded video data to the input/output node and for outputting video display data based on the decoded video data, received at the input/output node, to a decoded video data output terminal;

audio-data transmitting means having an input node connected to the data output node of said video/audio separator, for outputting the encoded audio data received at the input node, without first temporarily storing the encoded audio data in the storage means, in response to an audio data transmission enable signal; and an audio decoder for decoding the encoded audio data received from an output node of said audio-data transmitting means and outputting the decoded audio data to a decoded audio data output terminal.

13. The video/audio decoding and reproducing device according to claim 12 comprising control means including:

write address output means for outputting the write address signal to the storage means;

read address output means for outputting the read address signal to the storage means; and a buffer controller outputting the write enable signal and the read enable signal based on the write address signal from said write address output means and the read address signal from said read address output means to the storage means.

* * * * *